March 26, 1940. W. B. THOMPSON 2,194,487
FLOCK APPLYING APPARATUS
Filed March 11, 1936 5 Sheets-Sheet 1

March 26, 1940. W. B. THOMPSON 2,194,487
FLOCK APPLYING APPARATUS
Filed March 11, 1936 5 Sheets-Sheet 3

Fig. 4.

Inventor
Wayne B Thompson
by Charles W McDermott
his attorney

March 26, 1940.       W. B. THOMPSON       2,194,487
FLOCK APPLYING APPARATUS
Filed March 11, 1936        5 Sheets-Sheet 5

Inventor
Wayne B. Thompson
by Charles W. McDermott
his attorney

Patented Mar. 26, 1940

2,194,487

UNITED STATES PATENT OFFICE

2,194,487

FLOCK APPLYING APPARATUS

Wayne B. Thompson, Winchester, Mass., assignor to Spray Engineering Company, Somerville, Mass., a corporation of Massachusetts Application March 11, 1936, Serial No. 68,265

9 Claims. (Cl. 91—8)

The present invention relates to apparatus for applying material such as powder, flock, comminuted or finely divided solid material, or the like.

It has been proposed heretofore to provide such apparatus, but as a practical matter there have been several disadvantages with the types of apparatus used. In many commercial forms of flock appliers, for example, the flock is held in a container to which a motive agent, such as air under pressure, is supplied, the compressed air entraining the flock and causing the discharge thereof from a suitable nozzle or outlet from which the air escapes. While this arrangement is satisfactory in certain respects, the air compressor used with it is costly, and causes the apparatus as a whole to be expensive. But the use of air compressors has a further disadvantage in that it is necessary that the flock containers be closed tanks, and this in turn limits the supply of flock to the size of the container and requires a stoppage of the applying operation every time the supply of flock in the container is exhausted and is to be replenished. Stated in another way, with apparatus at present devised using compressed air as a motive agent, a continuous supply of flock, and therefore a continuous operation of the apparatus, are impracticable. A third disadvantage of flock appliers using compressed air as a motive agent lies in the difficulty of regulating as desired the amount of flock discharged. The reason for this is that the amount of discharge is regulated by regulating the pressure of the motive agent, and it is frequently impossible to vary the pressure conveniently or with the speed that the varying conditions of a given applying job require.

It is the principal object of the present invention to provide an apparatus for applying material of the type stated which eliminates the need for, and the expense of, an air compressor, which may be operated continuously, and which may be instantly and easily regulated to vary the amount of material applied.

To the accomplishment of this object and of such others as may hereinafter appear, the various features of the present invention reside in certain devices, constructions, combinations, and arrangements of parts fully set forth hereinafter and then pointed out broadly and in detail in the appended claims, possessing advantages which will be readily apparent to those skilled in the art.

The various features of the present invention will be readily understood from an inspection of the accompanying drawings, illustrating the best form of the invention at present known to the inventor, in which.

Figure 3:
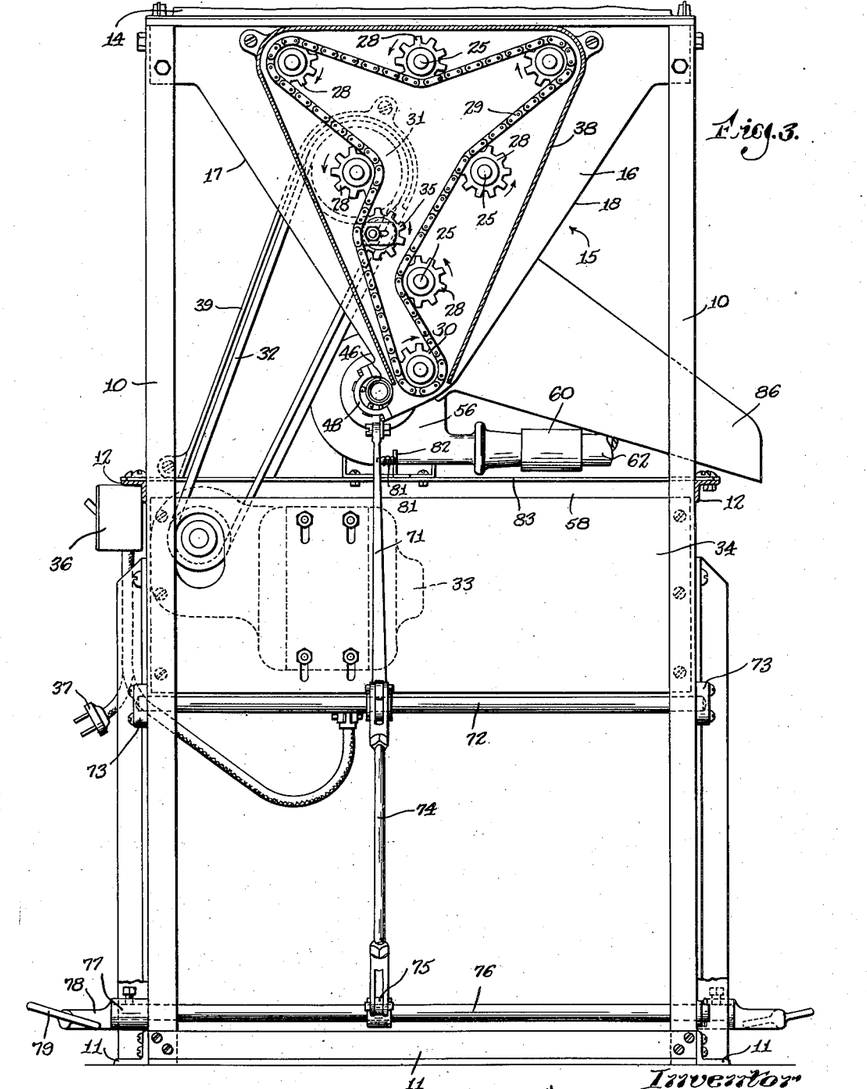
Fig. 3 is an enlarged detail view in right side elevation, partly in section, taken along the line 3—3 of Fig. 1.
Figure 4:
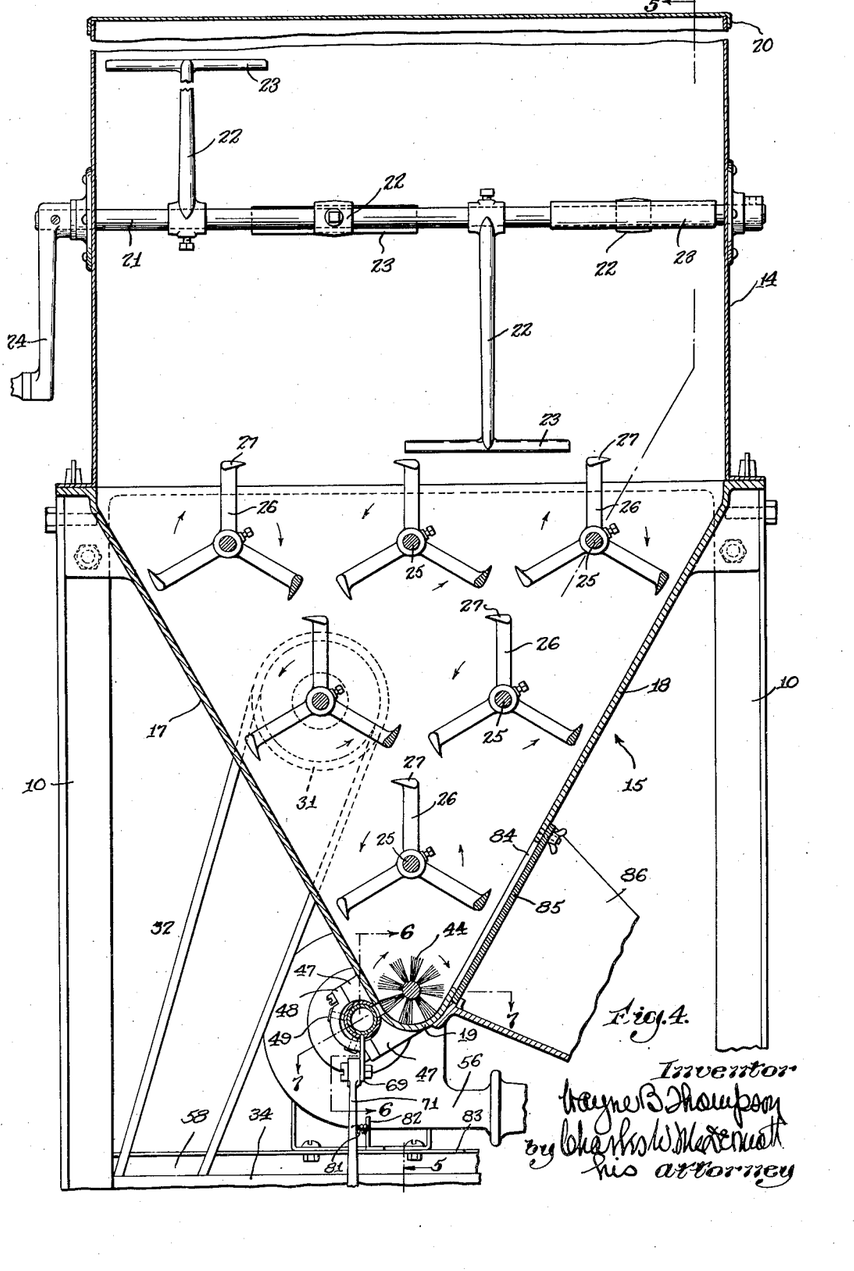
Fig. 4 is an enlarged detail view in right side elevation, partly in section, taken along the line 4—4 of Fig. 5.
Figure 5:
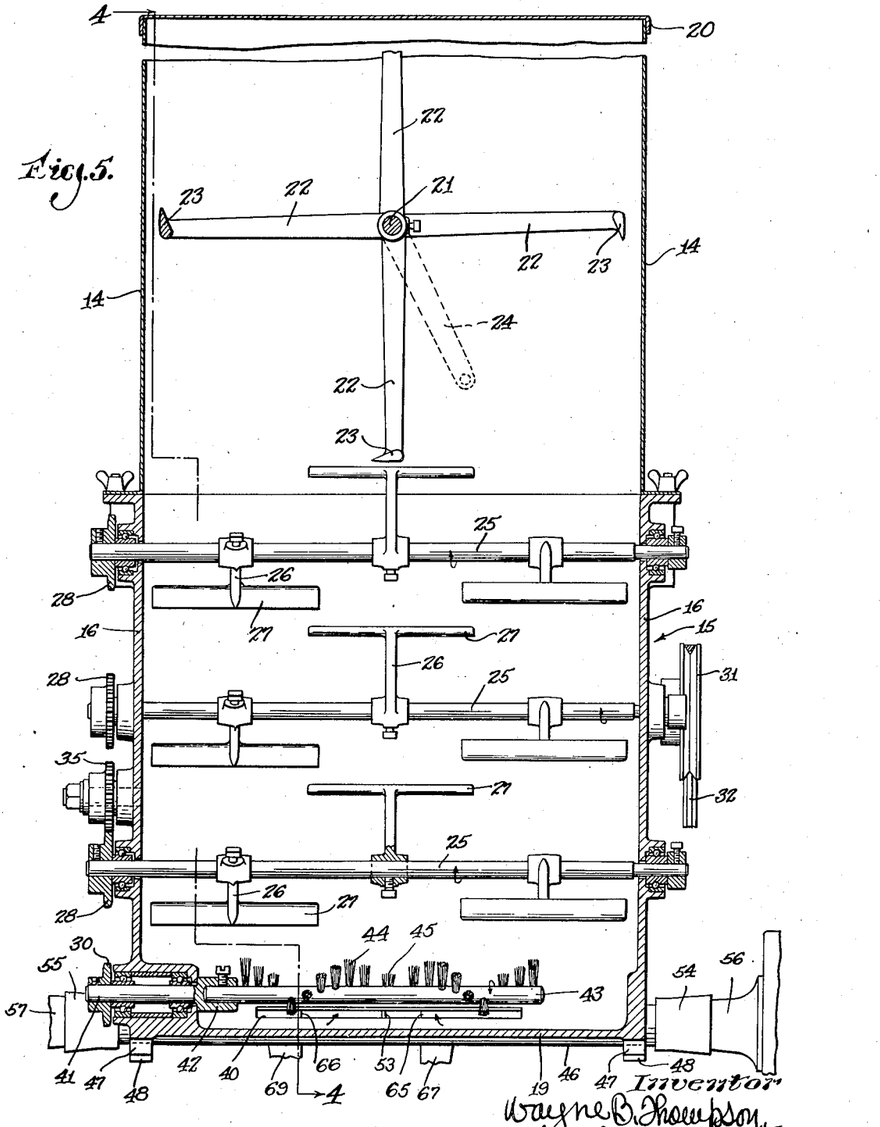
Fig. 5 is an enlarged detail view in rear elevation, partly in section, taken along the line 5—5 of Fig. 4.

The illustrated embodiment of the present invention is provided with a frame comprising uprights 10 (Figs. 2, 3, and 4) secured at their bottoms to frame members 11 forming a base and also secured intermediate their ends to front and rear horizontal frame members 12. The uprights 10 form a support for a container 13 comprising an upper or box portion 14 open at its top and bottom and a lower or hopper portion 15 the top of which is open and forms a continuation of the bottom of the box 14. The side walls 16 of the hopper 15 depend vertically, as shown in Fig. 5, while the front and rear walls 17 and 18, respectively, converge downwardly and merge in a rounded bottom 19, as shown in Figs. 3 and 4. The container 13 is closed at its top by a removable cover 20 which has a loose fit so that the interior of the container is under atmospheric pressure.

The container 13 receives the material to be applied, such as powder, flock, or any desired comminuted or finely divided solid material. It is well known to commercial users of apparatus for applying such material by the entraining action of an air current that the material must be constantly stirred or agitated within the container if the air current is to entrain it continuously and if a proper discharge of the material is to be effected. While this is true of material held in a closed container under greater than atmospheric pressure, it is also true of material held in a container under only atmospheric pressure. Stated in another way, gravity alone cannot be relied upon to insure the continuous and even flow of finely divided solid matter from a relatively small outlet at the bottom, for example, of a hopper.

As will be explained hereinafter, it is intended that the material in the container 13 pass out of the bottom of the hopper 15, and to insure that this takes place in an even and continuous manner the container 13 is provided with various means for agitating the material. The box 14 is provided with a horizontal shaft 21 (Figs. 2, 4, and 5) journaled on the front and rear walls of the box and provided with four agitators 22. As shown in Fig. 4, each of the agitators 22 is roughly T-shaped and comprises an arm one end of which is fixed on the shaft 21 and the other or free end of which is provided with a horizontal cross-piece 23. The agitators 22 are arranged along the shaft 21 successively 90 degrees apart throughout an arc of 360 degrees, and the down-going or leading side of each cross-piece 23 is preferably drawn into an edge, as indicated. As shown in Fig. 4 the length of each agitator arm is only slightly less than half the distance across the box 14, with the result that rotation of the shaft 21 insures the maximum agitation of the material within the box. A suitable handle 24 fixed on the end of the shaft 21 which is journaled on the front wall of the box 14 permits manual rotation of the shaft.

In order to agitate the material in the hopper 15, the hopper is provided with a series of horizontal shafts 25 the opposite ends of which are journaled on the side walls 16. Referring again to Figs. 4 and 5, the shafts 25 comprise three groups—an upper group of three adjacent the top of the hopper 15, a lower group of one above the rounded bottom 19 and below the central shaft of the first group, and an intermediate group of two below the first and second and the second and third shafts, respectively, of the first group and above and at the opposite sides of the single lower shaft. Each shaft 25 is provided with three agitators 26 similar in construction to the agitators 22. That is to say, each agitator 26 comprises an arm one end of which is fixed on its shaft 25 and the other or free end of which is provided with a horizontal cross-piece 27 the down-going or leading side of which is preferably drawn into an edge. The agitators 26 for each shaft 25 are arranged therealong successively 120 degrees apart throughout an arc of 360 degrees. Since there are six shafts 25 in all and since there are three agitators 26 on each shaft, the illustrated hopper 15 is thus provided with 18 agitators which considered together extend from one side wall 16 to the other, from the front wall 17 to the rear wall 18, and from the top of the hopper to a point adjacent the curved bottom 19. It will be apparent that rotation of the agitators 26 causes the material in the hopper 15 to be thoroughly stirred up.

It is preferred that the agitators 26 be rotated simultaneously and continuously so that the material in the hopper 15 is at all times in a state of movement. For this purpose the right hand end of each shaft 25 (the left hand end, viewing Fig. 5), is provided with a gear 28 fixed thereto and adapted to mesh with the links of an endless chain 29 (Fig. 3). The runs of the chain 29 may be located at one side or the other of the different gears 28, as the case may be, so that the shafts 25 do not all rotate in the same direction. A gear 30 (Figs. 3, 5, and 7) also meshes with the links of the chain 29, the purpose of this gear 30 being explained later. One of the shafts 25 of the intermediate group of shafts is provided on its left hand end (right hand end, viewing Fig. 5) with a pulley 31 fast thereon which is caused to rotate by means of a belt 32 driven by an electric motor 33 (Figs. 2 and 3) suitably mounted on a panel 34 secured to the frame. With this construction the rotative motion supplied by the motor is transferred to the chain 29 through the belt 32 and the pulley 31, and the gears 30 and 28 are caused to rotate simultaneously. To take up any loose play in the chain 29, an idler gear 35 meshing with the chain is mounted on a stubshaft adjustably journaled on the adjacent wall of the hopper. The motor 33 is provided with a switch 36 conveniently mounted on a frame member 12 and with the usual cord having a plug 37 for connection to some source of electrical energy (not shown). The gears 28, 30, and 35 and the chain 29 are concealed by a safety cover 38 (Figs. 1, 2, and 3) secured to the adjacent wall 16 of the hopper, and above the horizontal frame members 12 the pulley 31 and the belt 32 are concealed by a safety cover 39 secured to the adjacent wall of the hopper.

The construction so far described provides a container 13 for the material to be applied and a plurality of manually and power actuated agitators 22 and 26, the latter insuring that the material in the container is continually and thoroughly stirred up. In order to provide for the transfer of the material from the container 13, the rounded bottom 19 is provided at the base of the front hopper wall 17 with a horizontal slot 40 (Figs. 4, 5, 6, 7, and 8) through which the material may pass. The slot 40 need not extend across the full width of the hopper 15, and is located centrally of the base of the hopper wall 17.

In order to insure the positive transfer of material from within the hopper 15 into the slot 40, the present invention contemplates the provision of means for driving or sweeping the material across and into the slot. To this end a short shaft 41 (Figs. 5 and 7) is journaled at the base of the right hand hopper wall 16 (left hand, viewing Figs. 5 and 7). One end of the shaft 41 extends outside the hopper 15 and the gear 30 referred to above is fixed thereto. The opposite end of the shaft 41 extends interiorly of the hopper 15 and is provided with an enlarged end 42 having a socket in which one end of a brush rod 43 is fixed. The brush rod 43 is provided with bristle clusters 44 of such length as to engage the curved bottom 19 of the hopper and the face of the hopper wall 17 about the slot 40. Since the rod 43 is rotated by rotation of the gear 30 which in turn is actuated by the endless chain 29, it will be seen that the rod 43 and the bristle clusters 44 rotate with the agitators 26 and further agitate the flock and sweep it across and into the mouth of the slot 40.

Figure 7:
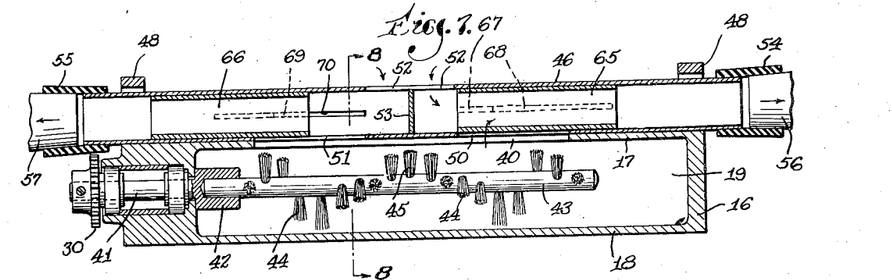
Fig. 7 is an enlarged detail view, partly in section, taken along the line 7—7 of Fig. 4.
Figure 8:
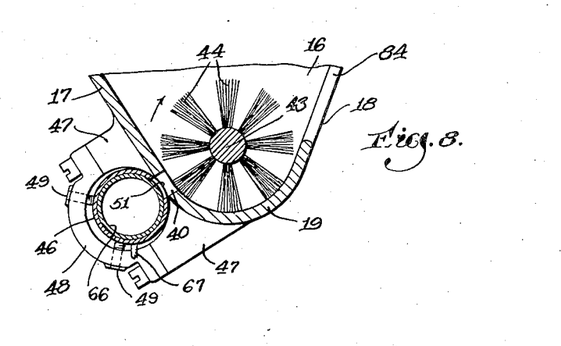
Fig. 8 is an enlarged detail view, partly in section, taken along the line 8—8 of Fig. 7.

In end view the bristle clusters 44 give the brush the appearance shown in Figs. 4 and 8, but as a matter of fact, viewing Figs. 5 and 7, it will be seen that the bristle clusters trace a reverse helical course around the rod 43 from the center line thereof in the direction of its opposite ends. Stated in another way, the helix formed by the bristle clusters between one end of the rod 43 and that cluster 45 which is intermediate the ends of the rod curves about the rod in one direction, while the helix formed by the bristle clusters between the opposite end of the rod and the intermediate cluster 45 curves about the rod 43 in the opposite direction. With this construction, the rotating bristle clusters act as a sort of screw, drawing the material from the sides of the hopper inwardly towards the center thereof along the wall 17 and towards the slot 40.

In the foregoing construction the material in the container 13 is under atmospheric pressure, and within the hopper 15 the material is continually kept in motion by the agitators 22 and 26. As the material thus has no opportunity to pack into a mass, the bristles 44 and 45 of the brush continually move in moving particles of material and as a consequence continually sweep those particles across and into the slot 40.

The material thus driven into the slot 40 is received by a horizontal tube or conduit 46 (Figs. 2, 3, 4, 6, 7, and 8) extending across the base of the front hopper wall 17. The tube 46 is supported adjacent its opposite ends by split clamps each of which comprises a lug 47 (best shown in Fig. 8) formed on the wall 17, and a cover 48 bolted to the lug 47. As shown in Figs. 3, 4, 7, and 8, the adjacent faces of the lug 47 and the cover 48 present a circular opening larger in diameter than that of the tube 46. The cover 48 is provided with set screws 49 which hold the tube 46 in abutment with the hopper wall 17 so as to cover the slot 40. This diametric difference permits the use of tubes 46 of different capacities, the set screws 49 functioning to maintain the tube in abutment with the hopper wall regardless of the size of the tube.

Referring now particularly to Figs. 5, 6, 7, and 8, the portion of the tube 46 covering the slot 40 is provided with a pair of spaced horizontal slots 50 and 51 which may be aligned with the slot 40. Each slot 50 and 51 and the associated portion of the slot 40 thus form together a passage into the tube 46 for the material swept from the hopper 15 into the slot 40 by the brush 42—43.

The present invention contemplates that the material entering the tube 46 be air-entrained and thus be discharged from the apparatus through a suitable applying means. To this end, the central portion of the tube 46 opposite the portion thereof abutting the hopper wall 17 is provided with an opening 52 (Figs. 2 and 7), and intersectingly of the opening the tube 46 is provided with a circular transverse partition 53. The partition 53 thus divides the tube 46 into two parts, the slot 50 and one half of the opening 52 being located in one half of the tube 46 and the slot 51 and the other half of the opening 52 being located in the other half of the tube. Each half of the opening 52 has an area substantially the same as the internal cross sectional area of the tube.

The opposite ends of the tube 46 form outlets and are connected by means of suitable nipples 54 and 55 (Figs. 6 and 7) to the intake ends of exhaust fans or blowers 56 and 57 (Figs. 1, 2, 3, 4, and 5) suitably connected to a source of power, such as electricity (not shown). The blowers are mounted on suitable supports 58 and 59, respectively, carried by the ends of the frame members 12, and the discharge ends of the blowers are connected by means of suitable nipples 60 and 61, respectively, to lengths of tubing 62 and 63, the free end of each of which is provided with a nozzle 64.

Figures 1, 2:
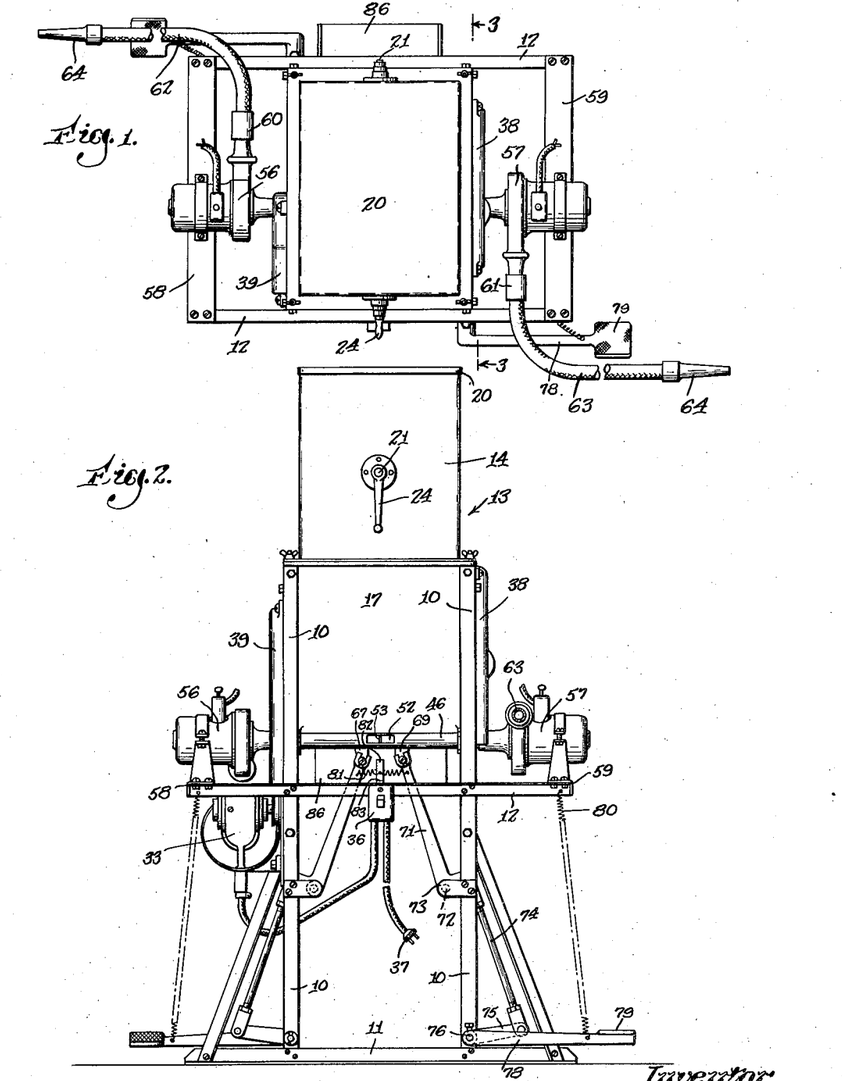
Figure 1 is a view in plan of the apparatus.
Fig. 2 is a view in front elevation of the apparatus.
Figure 6:
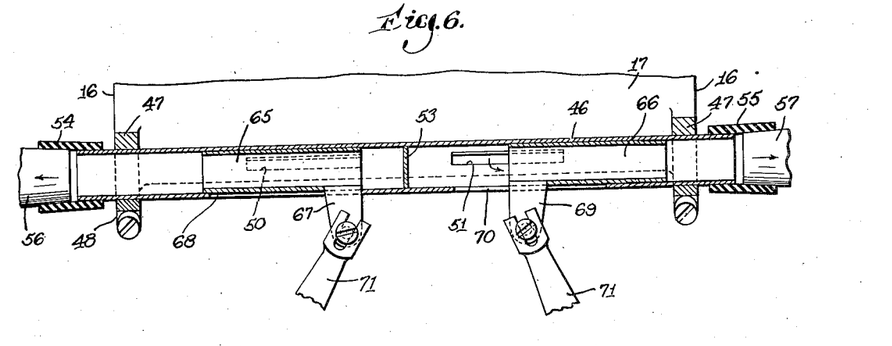
Fig. 6 is an enlarged detail view, partly in section, taken along the lines 6—6 of Fig. 4.

By reason of this construction, viewing Figs. 2 and 6, it will be seen that when the exhaust blower 56, for example, is in operation, a condition of unbalanced air pressure is established within the tube 46 between the portion of the opening 52 to the left of the partition 53 and the left hand end of the tube 46, the air entering the opening 52 from the atmosphere and moving in a current towards the left hand end of the tube. The entraining action of a current of air upon flock, powder, etc. in its path being well known, it will be seen that any material which enters the left hand half of the tube 46 through the slots 40 and 50 is entrained by the air current set up by the blower 56 and is drawn through the left hand part of the tube 46, the tubing 62, and its discharge nozzle 64. Precisely the same operation takes place to the right of the partition 53, viewing Figs. 2 and 6, when the fan 57 is in operation, that is, any material which enters the right hand half of the tube 46 through the slots 40 and 51 is entrained by the air current set up by the blower 57 and is drawn through the right hand half of the tube 46, the tubing 63, and its discharge nozzle 64. By reason of the partition 53, neither blower has any effect on the material on the opposite side of the partition, and the blowers may be used independently of each other or simultaneously. Stated in another way, the partition divides the tube 46 into two parts or conduits, and each conduit has its own associated apparatus for effecting the discharge of the material therefrom.

Since it is desirable that the amount of material discharged from either or both halves of the tube 46 be regulated and varied as desired, the present invention contemplates the employment of means for regulating the amount of material admitted into the tube 46 through the slots 50 and 51. To this end the tube 46 is provided interiorly with a sleeve 65 (Figs. 6, 7, and 8) located on one side of the partition 53 and associated with the slot 50. A similar sleeve 66 is provided interiorly of the tube 46 on the other side of the partition 53 in association with the slot 51. The sleeves 65 and 66 fit the tube 46 loosely enough to permit their sliding along the tube, but snugly enough so as to form with the slots 50 and 51, respectively, effective valves for preventing, when desired, the flow of material into the tube 46 while the fans 56 and 57 are in operation. In Figs. 6 and 7 the sleeve 65 is shown closing the slot 50 so as to prevent the passage of material into the left hand half of the tube 46, while the sleeve 66 is shown in such position that the slot 51 is about half uncovered.

In order to slide the sleeve 65 in the tube 46, the sleeve is provided, (Figs. 2 and 6) with a depending lug 67 which fits and extends through a longitudinal slot 68 formed in the bottom of the left half of the tube 46. The ends of the slot 68 form abutments for the opposite ends, respectively, of the lug 67, the slot being of such length that when the right hand ends of the lug and the slot abut, as in Fig. 6, the sleeve 65 covers the slot 50, and when the left hand ends of the lug and the slot 68 abut, the slot 50 is completely uncovered. The sleeve 65 is made sufficiently long so that when the slot 50 is closed by the sleeve, the slot 68 is also closed thereby. It will be appreciated, however, that by reason of this construction when the slot 50 is uncovered to any extent by the sleeve, the slot 68 is correspondingly uncovered. As a consequence air may enter the open slot 68 from the atmosphere when the blower 56 is in operation for the same reason that air enters the left hand portion of the opening 52. The slot 68 and the left hand portion of the opening 52 thus together comprise an air inlet for the left hand half of the tube 46.

The sleeve 66 is provided with a depending lug 69, like the lug 67, which is received by a slot 70, like the slot 68, positioned in a complementary position to the slot 68 so that a movement to the left or right of the lug 69 and the sleeve 66 has the same result for the slots 51 and 70 that movement of the lug 67 and the sleeve 65 to the right or left has for the slots 50 and 68.

Each sleeve is moved by its own moving means independently of the other, and since these moving means are of corresponding construction, only one need be described. Referring to Figs. 2, 3, and 6 the lug 69 is pivotally and slidably connected to the upper yoked arm of a bell-crank lever 71 which is fast on a horizontal shaft 72 journaled in brackets 73 secured to the right hand frame members 10. The other arm of the bell-crank lever 71 is pivotally secured to the upper end of a link 74 the lower end of which is pivotally secured to one end of a lever 75. The other end of the lever 75 is fast on a rock-shaft 76 journaled at the lower ends of the frame members 10. As shown in Fig. 3, one end of the rock-shaft 76 extends through its associated frame member 10, and is secured to a collar 77 formed on one end of a treadle lever 78 which extends at the side of the apparatus and is provided with a pedal 79. With this construction, viewing Figs. 2 and 6, it will be seen that when the pedal 79 is depressed, the rock-shaft 76 moves the lever 75 and the link 74 downwardly, which in turn cause the upper arm of the bell-crank lever 72 to move the lug 69 and therefore the sleeve 66 to the right so that the slots 51 and 70 are uncovered.

In order to retract the pedal 79 from its depressed position, that is, in order to maintain the pedal 79 normally elevated and therefore maintain the valve formed by the sleeve 66 and the slot 51 normally closed, one end of a coil spring 80 is secured to the treadle lever 78, and the other end of the spring is secured to a horizontal frame member 12. Augmenting the effect of the coil spring 80 is a second coil spring 81, one end of which is secured to the bell-crank lever 71 and the other end of which is secured to a bracket 82 upstanding on a strut 83 extending between the frame members 12. With this construction the two springs 80 and 81 effectively offset any loose play in the parts between the lug 69 and the pedal 79 and thus insure that the slots 51 and 70 are normally covered by the sleeve 66.

Since the sleeve 65 is moved to the left to uncover the slots 50 and 68, the apparatus for moving the sleeve 65 is conveniently located at the left of the machine, the various parts having the same construction as those named for moving the sleeve 66 and maintaining it in a position of closure, and functioning in the same way.

In order to unload the container 13 of any unused material that may be in it, the lower portion of the rear wall 18 of the hopper 15 is provided with an opening 84 (Figs. 4 and 8) normally closed by a removable panel 85, and associated with the opening 84 is a chute 86.

In using the illustrated embodiment of the present invention, the container 13 is filled with the material to be applied and the cover 20 put in place to protect the material from foreign matter which may be in the atmosphere. The material extends from the top to the bottom of the container, burying, as it were, the agitators 22 and 26 and the brush 42—43. No material can pass into either half of the tube 46 since the slots 50 and 51 are closed by the sleeves 65 and 66, respectively, which are held in position by reason, ultimately, of the springs 80 and 81. The switch 36 is then turned on, causing the motor 33 to be actuated and to transfer its rotary motion to the shafts 25, the agitators 26, and the brush 42—43 by means of the belt 32, the pulley 31, the drive chain 29, and the gears 28 and 30. The mass of material in the hopper 15 is at once agitated and stirred by the agitators 26, and is further agitated and stirred by the brush 42—43. In addition, the material in the bottom of the hopper 15 is driven and swept over and into the slot 40 where it is stopped by the sleeves 65 and 66. The operative then sets the blower 56, for example, into operation thereby establishing a condition of unbalanced air pressure between the portion of the opening 52 leading into the left half of the tube 46 on one hand and the associated end of the tube on the other hand, or more accurately, the nozzle 64, since the left half of the tube 46, the nipple 54, the fan 56, the tubing 62, and the nozle 64 therefor together form a conduit. This condition of unbalanced air pressure thus sets up an air current within the left half of the tube 46 travelling in the direction of the nozzle 64.

The apparatus is thus in readiness to apply the material in the container 13. To effect application the operative depresses the pedal 79 associated with the sleeve 65, whereupon the sleeve is moved to the left, viewing Figs. 2 and 6, the extent of this sleeve movement depending upon the extent to which the pedal 79 is depressed. Stated in another way, if only a light or small discharge of material is desired, the pedal is only slightly depressed, thereby causing the sleeve 65 to uncover the slot 50 only part way. The material in the hopper 15 is driven by the brush 42—43 into the now partially opened slot 50 from which it passes into the left half of the tube 46. As soon as the material enters the tube 46 it is entrained by the air current therein and is discharged from the nozzle 64 by the air issuing therefrom. Should it be desired to discharge a greater quantity of flock, the pedal 79 is depressed to a greater extent, thereby causing the sleeve 65 to uncover more of the slot 50 and thus permitting more material to be driven into the tube 46. By giving the slot 50 sufficient size so that when fully uncovered the maximum amount of material desired may be discharged, it will be seen that a proper depressing of the pedal 79 causes any desired amount of material to enter the tube 46 and hence causes any desired amount of material to be discharged from the tube 46, that is, from the nozzle 64 associated with the blower 56. Since the agitators 26 are continuously in motion, the material in the hopper 15 is continuously stirred up and has no chance to pack into a mass and cease flowing downwardly. As a consequence, the rotating brush 42—43 is continuously supplied with material which it continuously feeds to the slot 40. So long as the operative keeps the pedal 79 depressed as desired, there is a continuous discharge of material, and since the sleeve 65 responds to any movement of the pedal 79, the amount of material entering the tube 46 and discharged from the nozzle 64 may be varied and regulated instantly. To stop the discharge of material the operative merely removes his foot from the pedal 79, whereupon the springs 80 and 81 cause the sleeve 65 to close off the slot 50 and prevent the further transfer of material from the hopper 15 into the tube 46.

It was stated above in considering the slot 68, that although it is closed off by the sleeve 65 when the sleeve covers the slot 50, the slot 68 is uncovered when the sleeve 65 is moved so as to uncover the slot 50. It will be seen that when the slot 68 is thus uncovered (as indicated for the corresponding slot 70 in Fig. 6), air will enter the tube 46 by way of the slot 68 just as air enters the opening 52, and for the same reason, namely, the condition of unbalanced air pressure established by the blower 56. It was also stated above that the area of the portion of the opening 52 associated with either side of the partition 53 is substantially the same as the cross sectional area of the tube 46. By reason of this construction when the blower 56 is in operation with the sleeve 65 closing the slot 50, only air is passing through the left half of the tube 46, and there is no resistance to its passage since the opening portion 52 is substantially the same size as the cross sectional area of the tube. When, however, the sleeve 65 is opened, the material entering the tube 46 cuts down the space which the air therein can occupy, and hence forms a resistance to the passage through the tube 46 of the air admitted through the opening 52. The greater the amount of material admitted to the tube the greater the resistance offered by the material to the incoming air. It will at once be seen that the direct and immediate result of this situation is to cut down the velocity of the air current within the tube 46.

The opening of the slot 68 as the sleeve 65 is withdrawn from the slot 50 counteracts and offsets this velocity reduction. Stated in another way, although the flock entering the tube 46 offers a resistance to the air entering the opening 52, the opened slot 68 functions to supply the tube 46 with additional air to overcome the resistance offered by the material. Since the slots 50 and 68 are opened to the same extent simultaneously by the sleeve 65, the greater the amount of material admitted into the tube 46, the greater the amount of air admitted into the tube 46 also. The uncovering of the slot 68 by the sleeve 65 thus serves to vary the size of the air inlet formed by the slot 68 and the inlet 52, that is, serves to vary the amount of air entering the inlet, and this air variance occurs as the amount of material entering the tube 46 is varied.

The above description of the operation of the apparatus applies to the discharge of material from the left half of the tube 46, but in view of the above described structure it will be seen that this description of operation applies also to the discharge of material from the right half of the tube 46. While an operative is depressing the left hand pedal 79 and is discharging material through the conduit associated with the fan 56, another operative may simultaneously actuate the fan 57 and effect the discharge of material through the other conduit by depressing the right hand pedal 79. Material may also be discharged in this way when the fan 56 is not in operation.

In view of the foregoing, it will be seen that the illustrated embodiment of the present invention is a marked improvement over apparatus employing compressed air as a motive agent. No air compressing apparatus is utilized, and since exhaust fans are relatively inexpensive as compared to the cost of air compressors, the illustrated embodiment of the present invention thus eliminates a large item of cost involved in applying apparatus of the type using compressed air as a motive agent. As a further point, the amount of material discharge by either nozzle 64 can be easily and instantly regulated by merely shifting the position of the associated pedal 79, and this involves no changing of the speed of the fan. As a third point, the application of material is continuous. Since the container 13 is under only atmospheric pressure, the apparatus continues in operation even when the cover 20 is removed, and as the material within the container diminishes in amount, more can be poured into the box 14 as often as needed during the continued operation of the apparatus. Although the agitators 22 in the box 14 are manually operated, it will be apparent that so far as mere agitation of the box contents is concerned, the agitators 22 might be driven continuously like the agitators 26. Manual operation for the agitators 22 is preferred, however, since if they were continuously in motion, material poured into the box 14 during the continued operation of the apparatus might be deflected by the moving agitators 22 and spilled outside.

Nothing herein explained is to be interpreted as limiting the various features of the present invention in the scope of its application to use in connection with the particular apparatus or the particular mode of operation or both selected for purposes of illustration and explanation. While the particulars of construction herein set forth are well suited to one mechanical form of the invention and to the use to which it is put, it is not limited to this use, nor to these details of construction, nor to the conjoint use of all its features, nor is it to be understood that these particulars are essential since they may be modified within the skill of the artisan without departing from the true scope of the actual invention, characterizing features of which are set forth in the following claims by the intentional use of generic terms and expressions inclusive of various modifications.

What is claimed as new, is:

1. In an apparatus for applying material such as powder or flock, the combination with a container for the material, a conduit provided with an air inlet, an outlet, and a passage communicating with the container, said conduit being provided with a portion which is removably associated with the container and the rest of the conduit, said air inlet and said passage being located in said conduit portion, means in the container for transferring material therefrom to the conduit portions by way of the passage, and means for creating a condition of unbalanced air pressure between the inlet and the outlet of the conduit to cause atmospheric air to enter the inlet and travel in a material-entraining current within the conduit and out the outlet, of means including an element through which the material flows after reaching the conduit portion for varying the amount of material transferred to the conduit during the continued operation at a given rate of the material transferring means.

2. In an apparatus for applying material such as powder or flock, the combination with a container for the material, a conduit communicating with the container and provided with a lateral air inlet and an outlet, means for supplying the conduit with material from the container, and means for creating a condition of unbalanced air pressure between the inlet and the outlet of the conduit to cause atmospheric air to enter the inlet and travel in a material-entraining current within the conduit and out the outlet, of means including a member located within the conduit and reciprocable lengthwise for varying the amount of air entering the conduit during the continued operation at a given rate of the means for creating the condition of unbalanced air pressure.

3. In an apparatus for applying material such as powder or flock, the combination with a container for the material, a conduit communicating with the container and provided with an air inlet and an outlet, means for supplying the conduit with material from the container, means for creating a condition of unbalanced air pressure between the inlet and the outlet of the conduit to cause atmospheric air to enter the inlet and travel in a material-entraining current within the conduit and out the outlet, and means including an element through which the material flows after reaching the conduit for varying the amount of material supplied to the conduit, of means for varying the amount of air entering the conduit during the continued operation at a given rate of the means for creating the condition of unbalanced air pressure.

4. In an apparatus for applying material such as powder or flock, the combination with a container for the material, a conduit communicating with the container and provided with an air inlet and an outlet, means for supplying the conduit with material from the container, and means for creating a condition of unbalanced air pressure between the inlet and the outlet of the conduit to cause atmospheric air to enter the inlet and travel in a material-entraining current within the conduit and out the outlet, of means including an element through which the material flows after reaching the conduit for simultaneously varying the amount of material supplied to the conduit and the amount of air entering the conduit during the continued operation at a given rate of the means for creating the condition of unbalanced air pressure.

5. In an apparatus for applying material such as powder or flock, the combination with a container for the material, a conduit communicating with the container and provided with a lateral air inlet and an outlet, said inlet being normally at least as large as the internal cross sectional area of the conduit, means for supplying the conduit with material from the container, and means for creating a condition of unbalanced air pressure between the inlet and the outlet of the conduit to cause atmospheric air to enter the inlet and travel in a material-entraining current within the conduit and out of the outlet, of means including a member located in the conduit and reciprocable lengthwise for increasing the effective size of the inlet.

6. In an apparatus for applying material such as powder or flock, the combination with a container for the material, a conduit provided with an air inlet, an outlet, and a passage communicating with the container, means in the container for transferring material therefrom to the conduit by way of the passage, and means for creating a condition of unbalanced air pressure between the inlet and the outlet of the conduit to cause atmospheric air to enter the inlet and travel in a material-entraining current within the conduit and out the outlet, of a single means located in the conduit for simultaneously varying the effective size of the passage and the effective size of the inlet.

7. In an apparatus for applying material such as powder or flock, the combination with a container for the material, a conduit provided with an air inlet, an outlet, and a passage communicating with the container, means for transferring material to the conduit by way of the passage, means including a member located within the conduit and reciprocable lengthwise for normally covering the passage, and means for moving the covering means to uncover the passage and permit the transfer of material to the conduit, of means for creating a condition of unbalanced air pressure between the inlet and the outlet of the conduit to cause atmospheric air to enter the inlet and travel in a material-entraining current within the conduit and out the outlet, said covering means being so constructed that said air current flows through it whether in covering or uncovering position.

8. In an apparatus for applying material such as powder or flock, the combination with a material container provided with a slot, a conduit separate from the container and provided with a portion having a slot extending lengthwise thereof and adapted to be aligned with the container slot, means for removably supporting said conduit so that the slots are in alignment and for forcing the slotted portion of the conduit into contact with the slotted portion of the container, and means for transferring material from the container to the conduit by way of the aligned slots, of means separate from the transferring means for discharging said material from the conduit.

9. In an apparatus for applying material such as powder or flock, the combination with a container for the material, a conduit provided with an air inlet, an outlet, and a passage communicating with the container, means in the container for transferring material to the conduit by way of the passage, a single means located in the conduit for normally covering the passage and a portion of the air inlet, and means for moving the covering means so that the passage is uncovered to permit the transfer of material into the conduit and so that the air inlet is more open than normally, of means for creating a condition of unbalanced air pressure between the inlet and the outlet of the conduit to cause atmospheric air to enter the inlet and travel in a material-entraining current within the conduit and out the outlet.

WAYNE B. THOMPSON.

CERTIFICATE OF CORRECTION.

Patent No. 2,194,487.  March 26, 1940.

WAYNE B. THOMPSON.

It is hereby certified that error appears in the printed specification of the above numbered patent requiring correction as follows: Page 6, second column, line 38, claim 8, before "so" insert --portion--; and that the said Letters Patent should be read with this correction therein that the same may conform to the record of the case in the Patent Office.

Signed and sealed this 7th day of May, A. D. 1940.

(Seal)

Henry Van Arsdale,
Acting Commissioner of Patents.